United States Patent Office.

WILLIAM W. CHIPMAN, OF BROOKLYN, ASSIGNOR OF TWO-THIRDS TO WILLIAM COURTENAY AND JOSEPH C. TIFFANY, BOTH OF NEW YORK, N. Y.

MANUFACTURE OF STEEL.

SPECIFICATION forming part of Letters Patent No. 287,235, dated October 23, 1883.

Application filed August 18, 1883. (No specimens.)

*To all whom it may concern:*

Be it known that I, WILLIAM W. CHIPMAN, a citizen of the United States, residing at Brooklyn, in the county of Kings and State of New York, have invented new and useful Improvements in Manufacture of Steel, of which the following is a specification.

In Letters Patent No. 265,656, granted to me the 15th day of October, 1882, I have described a process of manufacturing steel from oxide-of-iron ores or from sand and furnace-slags containing oxides of iron, said process consisting in melting said oxides of iron in a furnace or crucible composed wholly or in part of plumbago, or lined with plumbago alone, or with a mixture of plumbago with some refractory material like fire-clay. The oxides of iron, when thus melted from said ores, sand, or slags, coming in direct contact with the inner surfaces of the furnace or crucible, absorb carbon therefrom in a quantity proportioned to the length of time the same are in contact. By research and experiment I have discovered that fine steel of different grades may be made from Bessemer or open-hearth steel by melting the same in furnaces or crucibles lined with or composed wholly or in part of plumbago, without the addition of carbon or spiegeleisen.

My present invention therefore consists in an improved process of manufacturing fine steel from the grades of steel and iron named without the addition of carbonaceous matter, by either melting the steel or wrought-iron in furnaces or crucibles of the class described, or by drawing a charge of molten Bessemer or open-hearth steel directly from the converter, furnace, or ladle into a plumbago crucible or furnace, or one lined with the same material either in whole or in part. In either case the molten steel or wrought-iron absorbs from the plumbago of the crucible or furnace the quantity of carbon required to convert the metal into fine steel of any desired higher grade, the quality of the latter being determined by the length of time the molten metal remains in the furnace or crucible, the percentage of carbon absorbed being dependent thereon. It may be added that as the wrought-iron will melt only when it has absorbed a certain proportion of carbon, its conversion takes place almost at the moment a molten state is reached. In the case of Bessemer or open-hearth steel, the change is speedily accomplished, and it is difficult to prescribe any precise period of time required for the conversion. This will easily be determined in practice.

By this invention I am enabled to produce fine steel of the required grades from Bessemer or open-hearth steel or wrought-iron at a single operation, and without the addition of carbonaceous material or any fluxes, in the manner heretofore practiced.

Having thus described my invention, what I claim is—

1. The process herein described of manufacturing fine grades of steel from Bessemer or open-hearth steel or wrought-iron without the addition of fluxes or carbonaceous material, said process consisting in melting the same in furnaces or crucibles lined with or composed wholly or in part of plumbago, substantially as described.

2. The process described for manufacturing fine grades of steel from Bessemer or open-hearth steel without the addition of fluxes or carbonaceous material, consisting in drawing a charge of the same from the converter, furnace, or ladle in a molten condition, into a crucible or furnace lined with or composed wholly or in part of plumbago, whereby remelting of the metal is avoided.

In testimony whereof I have hereunto set my hand in the presence of two subscribing witnesses.

WILLIAM W. CHIPMAN.

Witnesses:
   JOS. L. COOMBS,
   A. H. NORRIS.